Patented July 13, 1937

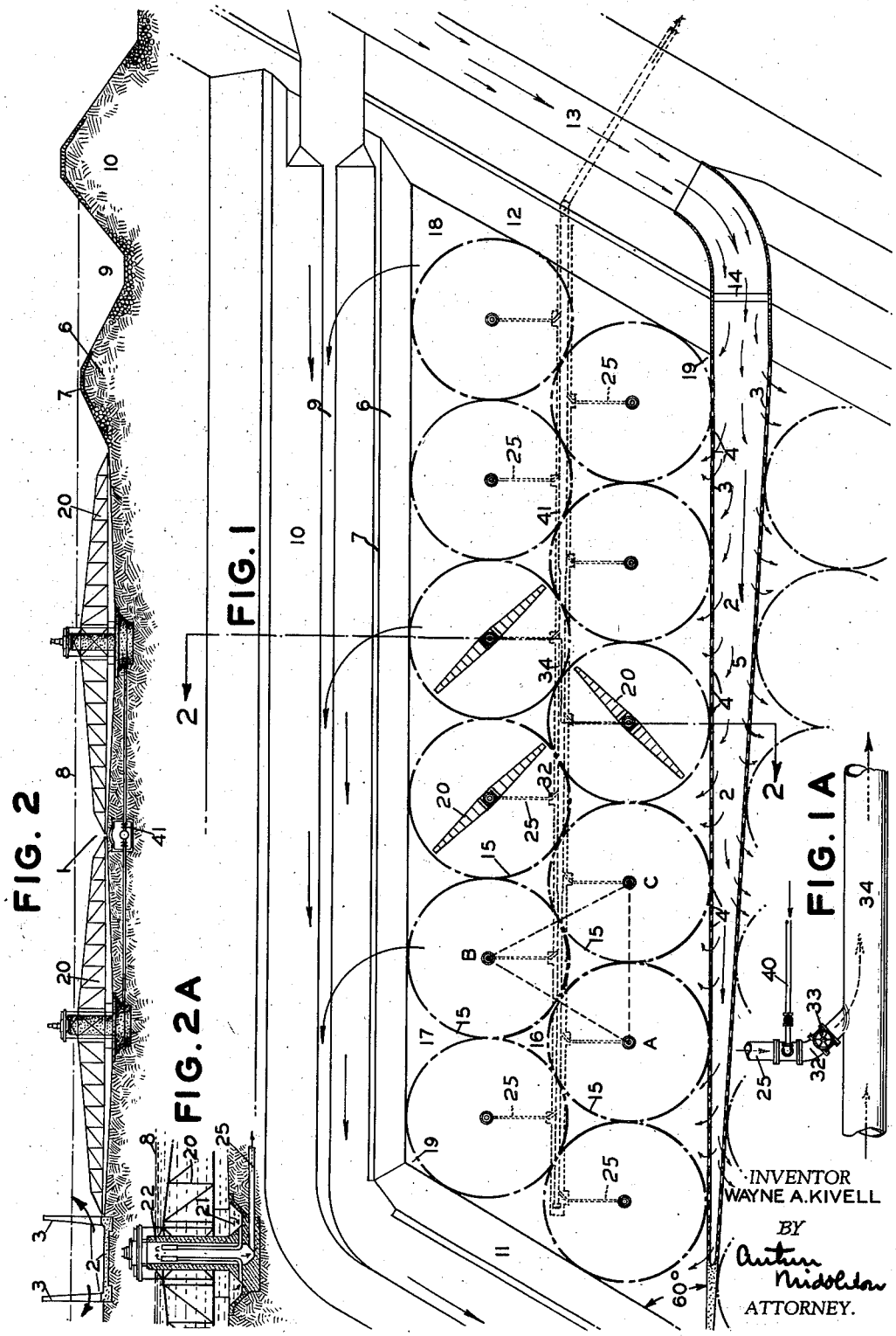

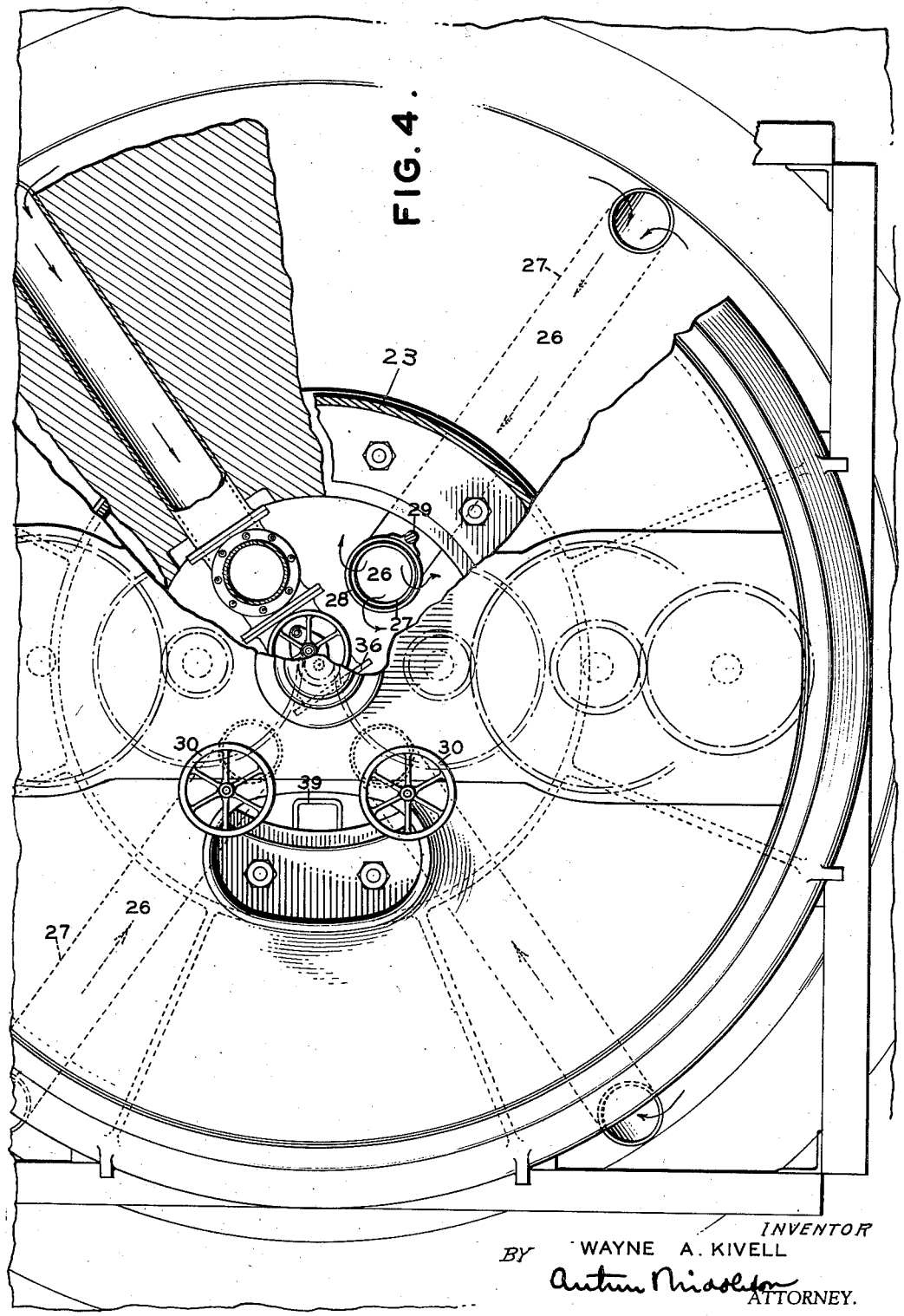

2,086,955

UNITED STATES PATENT OFFICE 2,086,955

SEDIMENTATION APPARATUS

Wayne A. Kivell, Evanston, Ill., assignor to The Dorr Company, Inc., New York, N. Y., a corporation of Delaware Application July 13, 1935, Serial No. 31,139

5 Claims. (Cl. 210—55)

The invention relates to the art pertaining to the sedimentation of solids or, as otherwise expressed, to the effecting of the settling of solids either contained in or in suspension in the liquid of a liquid-solid mixture.

More specifically, the invention is in respect to novel systems, apparatus and devices, and it particularly relates to the novel arranging and employing of parts which enter into the construction of, or impart novel characteristics to and which are employable in such systems, apparatus and devices.

In certain sections of the world, and particularly in certain sections of the central and western portions of the United States, the surface soil is composed of fine earthy particles or, in any event, comprises a large percentage of such type of earthy material. This may properly be described in many instances as "alluvial" soil and is thus referred to herein.

This soil is readily picked up and mixed with water flowing thereover, with the result that the streams have a decided muddy appearance and characteristic.

If attempt is made to divert water from the main stream for use elsewhere, as for example in the irrigation of land adjacent or even quite distant from the river, there is experienced a substantial sedimentation of the solid content of the diverted stream in such a manner that in the channel or conduit therefor there is built up a progressively increasing body of sedimented solids, which ultimately obstructs the desired flow of diverted water through the channel.

The solid content of the type referred to when experienced in rivers, is frequently referred to as silt, and the present invention may be viewed as primarily revolving about a desilting operation and an apparatus, arrangement or system for continuously performing the same. Or as otherwise expressed, the present invention revolves about an apparatus or system which has been devised and developed to effect a substantial desilting of the water diverted from a river bed prior to the delivery of the diverted water into the channel or conduit leading from the desilting system to the place of ultimate use.

While it may be feasible to operate such a system according to a batch process, nevertheless in the preferred and desired mode of operation the supply of water to the sedimenting or desilting plant should be relatively continuous; the delivery of relatively clarified or substantially desilted water as effluent from the plant to the channel leading therefrom should be relatively continuous; and there is preferably carried out a continuous removal of the solid content along another path leading from the desilting plant whereby the removed solid content is eliminated from the clarified or desilted water passing into the delivery channel or conduit.

The foregoing has been incorporated in order to orient the invention respecting the art to which it particularly pertains.

It is old in sedimentation apparatus to have a basin or tank provided with a centrally located pier or column upon and by which a mechanism for raking and transferring settled solids is mounted so as to be rotatable about a vertically extending axis, and to provide the tank or basin with a centrally located receiving trough into which the solids raked and transferred thereto by said raking and collecting mechanism are received preparatory to their being passed from the sedimentation basin.

The present invention revolves about the providing of a pipe or conduit that leads from this centrally located discharge section to and upwardly within a hollow central portion of the column or pier upon and by which the raking mechanism is carried.

The pipe construction just referred to is adjustable as to vertical height at the delivery end thereof and provides an overflow sleeve which is relied upon to regulate the amount of liquid-solids discharge which will pass therethrough and therefrom.

The upper end of each of the delivery pipes just referred to is substantially above the bottom or floor of the sedimentation tank, but is somewhat below the general operating level of the liquid undergoing sedimentation or desilting therein, with the result that, depending upon the height of the terminal or overflow section of this pipe, there is controlled the degree of solids concentration of what is properly referred to as the "silt" which will flow from the sedimentation zone outwardly through this pipe.

While the present invention and the location of these pipes have been initially devised and developed for use in a system or arrangement which is shown in the Coulter application, which is being filed concurrently herewith, nevertheless it will be appreciated that this type of overflow and solids-controlled concentration is applicable to forms of desilting or sedimenting apparatus having central pier constructions such as referred to, and is not necessarily limited to a sedimentation apparatus having a plurality of rotatable scraping mechanisms or, as otherwise expressed, having a plurality of pier constructions.

A further aspect of the invention revolves about the providing of a construction according to which the height of the terminus or overflow section of the silt-discharge pipes can be adjustably positioned or determined from the exterior of the column.

A further aspect of the invention revolves about a construction according to which access may be had to the central pier whereby an operator can enter it for any purpose desired, particularly during a period when the sedimentation unit is not functioning.

A further aspect of the invention revolves about the employing of a central pier as a part of the system, through and by means of which silt from the system is discharged.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which Fig. 1 is a plan view of a sedimentation unit particularly designed and constructed for use in the desilting of river water;

Fig. 1A shows a detail employed in the construction of Fig. 1 but taken on a somewhat larger scale than appears in Fig. 1.

Fig. 2 is a vertical view taken as on the plane indicated by the broken line 2—2 of Fig. 1 looking in the direction of the arrows.

Fig. 2A is a vertical sectional view, taken on a somewhat larger scale than Fig. 2, of a constructional detail and arrangement employed in Fig. 2.

Fig. 4 is a horizontal view partially in section and taken on a somewhat larger scale than that employed in Fig. 3, and is a view taken as on the broken line 4—4 of Fig. 3 looking downwardly—as indicated by the arrows 4—4 of Fig. 3.

Figure 3:
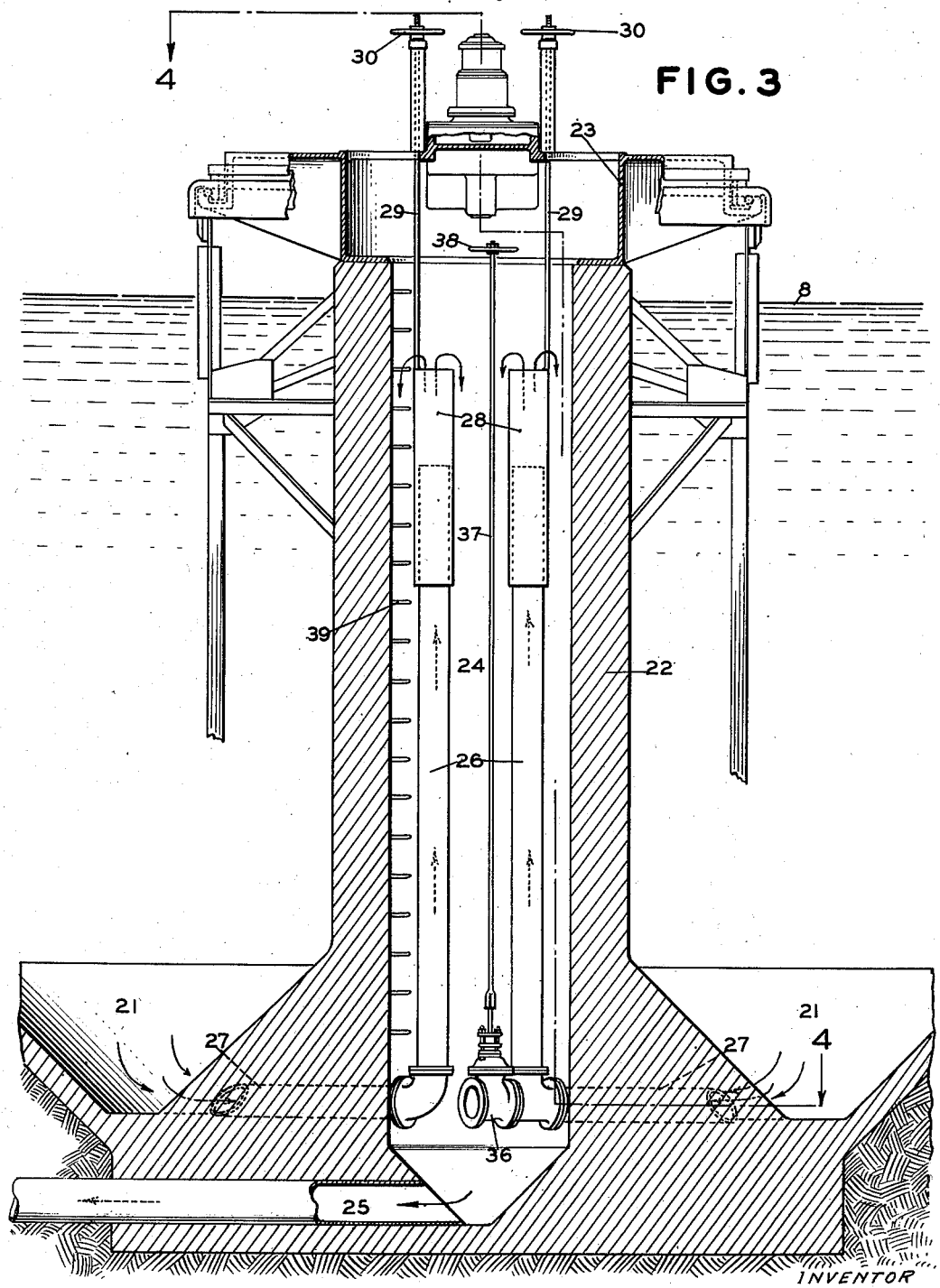
Fig. 3 is a vertical sectional view, taken on a still larger scale, showing still more clearly certain constructional features, the assemblage relationship of which is indicated by Fig. 2A.

Reference will now be made to the drawings in detail.

Therefrom, in connection with the description herein set forth, one will readily appreciate how the invention hereof is embodied in and is useful in the functioning of the sedimentation or desilting unit as a whole and particularly in respect to the use of such unit in the desilting of river water.

The sedimentation unit embodies a sedimentation trough or basin collectively designated as 1. In the construction shown it has been formed and largely defined by the excavating of land to provide the sedimentation zone of the basin, and three portions of the boundary wall of the basin are provided by mounds or water retaining sections of earth left or formed as the result of the excavating operations. A fourth portion of the boundary wall of the sedimentation basin is provided by a concrete influent channel construction.

The concrete influent channel construction just referred to is designated by 2. It has upstanding side or wall portions 3—3, and openings 4. The side walls 3—3 are arranged so that according to the horizontal view there is provided a progressively tapering influent channel 5 which in cross section gradually decreases in passing towards the forward or foremost discharge section thereof. The construction of this influent channel may be described as providing influent openings which are arranged at and along one side or end portion of the sedimentation basin. A weir construction is provided at and along the opposite side or end portion of the sedimentation basin, to wit, by an extended mound or retaining section of earth 6 which is capped by a concrete construction at 7, and thus provides the weir which is slightly below the normal operating level of the sedimentation basin as indicated by the line 8 whereby—as the result of a continuous inflow, through the openings 4 of influent or water to be subjected to sedimentation, that is, to a desilting operation—there can follow a continuous overflow as relatively clarified or desilted effluent of the supernatant of the sedimenting or desilting operation that is carried out within the sedimentation zone of the sedimentation trough or basin. The overflow past the weir is into a main effluent conduit or trough 9 which is in part defined by the mound or retaining section 6 heretofore referred to and by a higher mound or retaining section 10. The other marginal or boundary wall portions of the sedimentation basin are provided by extended mound sections as 11 and 12, the top of which, it will be apparent, should extend substantially above the normal general level of the liquid as indicated by 8.

The concrete influent channel construction 2 extends to and within a main supply channel 13, the details of which it is not necessary to describe in connection with the present invention. It will be manifest, however, that provision should be made for interrupting the flow, as desired, from the channel 13 to and into the influent section 2, and to that end a valve or gate may be incorporated as at 14.

The sedimentation basin 1 may be considered as having or as comprising nested sections indicated, for example, by the long and short heavy dash circles 15 in Fig. 1. In effect, these circles or the portions defined thereby may be considered as arranged in two rows, in each of which rows is provided or comprised a series of juxtaposed sections in which adjacent floor portions or bottom sections defined by circles 15 are tangent to each other. The two rows or longitudinally arranged series of circular portions may be considered as transversely spaced and the two rows of circular portions are arranged in respect to each other in such a manner that any one circular portion contacts or is tangent to two other circular portions adjacent thereto whereby, in respect to any three circular portions of which each circular portion merges into the other two circular portions, there results a triangular arrangement of which the center of each circular portion is at the vertex of an acute angle of an equilateral triangle which is formed by lines connecting the centers. The retaining mound or sections 11 and 12 in fact practically parallel certain lines connecting these centers or, as otherwise expressed, have an inclination of 60° in respect to the influent channel side walls 3. Or as otherwise expressed, the flow from the influent channel 2 across the sedimentation basin and ultimately over the weir 6 thereof is in a general direction which is at 60° in respect to the influent channel.

The floor or bottom sections defined by the circles 15 may be viewed as slightly dished because there is a gradual and gentle downward slope in passing from the edge of the circular portion 15 towards the center thereof. This slope is manifest from an inspection of Fig. 2 and it is to be noted that the floor or bottom of the sedimentation basin is left relatively free and unobstructed without any substantial upward projections or cross walls between the several sections indicated by the circles 15.

In the construction shown there are left what may be considered as "islands" at 16, 17, 18, and 19, but in connection with a desilting plant the sediment which will deposit upon these islands should not be found objectionable.

The floors as defined by the several sections 15 gradually merge from one into the other whereby any substantial upward projection is avoided and each section is served or provided with a solids-raking and collecting mechanism 20, frequently referred to as a solids-scraping and collecting assemblage, that is provided for raking settled solids deposited upon and within the sections 15, and for conveying solids collected thereby to and within a depressed floor section or sump 21 which is sometimes herein referred to as a solids-receiving trough, and which may also be properly referred to as a solids-collecting trough or even as a sediment receiving section. This trough is clearly indicated in Fig. 2A and Fig. 3.

Each section 15 has a stationary hollow upstanding pier or column 22, at the base of and around which said collecting trough is arranged as clearly shown in Figs. 2A and 3. This hollow column 22 extends above the general liquid level as at 8 and is capped by any suitable frame member as 23 which serves as part of the mechanism, by and through the medium of which the solids-raking and conveying assemblage is rotatably mounted on and carried by said pier or column.

It will hereafter more clearly appear that the particular mechanism by which the solids-raking and collecting assemblage is carried and operated is not an essential part of the present invention, mechanism for accomplishing this purpose being already old in the art, and an improved form or type of mechanism for this and which is particularly useful in connection with the present invention is being made the subject of a patent application being filed concurrently herewith, to wit, an application of Charles H. Scott entitled "Sedimentation apparatus".

The pier or column 22 provides a chamber 24, sometimes referred to as the pier chamber, which is open and accessible from the top but which is relatively closed at the bottom except for a conduit as 25 leading therefrom, the purpose of which will subsequently appear.

A construction herein referred to as an overflow pipe or conduit construction is broadly designated by 26, and it comprises pipe or conduit sections 27 which lead from the solids-receiving or collecting trough 21 to, into and upwardly within the chamber 24. At the upper section of this pipe or conduit construction 26 there are provided vertically positionable or vertically adjustable pipe or sleeve-like elements 28 which are relied upon for determining the vertical elevation of an overflowing section of said overflow pipe construction. This section by being vertically positionable or adjustable can be relied upon and is relied upon to regulate to a certain extent the type of outflow from the trough or sump 21 or, in other words, to regulate or adjust the degree of solids concentration which will necessarily take place as the sedimentation unit operates in a continuous manner. The vertically positioning or adjusting of the overflow sections 28 can be accomplished in any suitable manner, and in the construction shown is accomplished by the vertically moving of the section 28 by and through the medium of a rod 29 and screw adjusting means 30.

There is sometimes desired the emptying of the entire content of the sedimentation basin, and to this end a stop valve or gate 36 is provided in a part of the conduit construction that leads from the lowermost portion of the sedimentation basin. The pier chamber 24 extends substantially below the general elevation of the floor or bottom of the basin and thus assures the effective draining of the basin when the valve or gate 36 is left open.

The chamber 24 into which the liquid-solids mixture flows from the receiving trough 21 past the overflow, is sometimes called a silt-receiving chamber. The overflow has been made vertically adjustable or, in other words, vertically positionable in order to determine, adjust or control the degree of solids concentration in the liquid-solids mixture which thus passes from the overflow to and into said chamber. This vertical adjustment of the overflow is effected by the vertically positioning of the part or parts 28.

From the chamber 24 the liquid-solids mixture flows through the conduit section 25, past the section 32, past the valve 33 therein, to and into a main silt-discharge conduit 34, as will be manifest from an inspection of Figs. 1, 1A, and 3. In this manner the liquid-solids mixture obtained from the bottom of the sedimentation basin may be discharged exteriorly of the system to a point away from the effluent which passes the sedimentation basin over the weir 7.

In the arrangement shown one sedimentation unit has been installed along one side portion of the influent channel 2. It will be manifest that a similar type of sedimentation unit can be installed along the opposite side portion of the same influent channel, and in this way a sedimentation or desilting unit of large capacity can be realized.

It may be advisable or necessary to effect a direct draining of the sedimentation basin, and to that end one of the overflow conduit constructions or some other pipe leading from the lowermost interior portion of the sedimentation zone is provided with a stop valve 36 which is normally closed but which when open allows a direct draining of the sedimentation basin. The valve 36 may be operated as through the valve stem extension 37 thereof and the hand wheel 38. It is to be noted that this stop valve 36 is considerably below the general elevation of the delivery section as determined by the overflow sections 28.

It is to be noted that the overflow sections 28 are well above the lowermost defines of the sedimentation basin, and in the particular type of apparatus shown they are located only a relatively short distance below the general operating level 8 of the liquid within the sedimentation basin. The higher the elevation of the overflow sections 28, the greater will be the degree of solids concentration in the liquid-solids mixture passing outwardly thereover.

The solids scraping and collecting mechanism or assemblage 20 may be viewed as a motivated sediment raking assemblage turnable about the hollow pier and which functions incident to the turning thereof to effect an impelling and transfer of sedimented material from diverse sections from the bottom or floor of the tank, to wit, by the particular assemblage serving the same or functionally disposed thereover, to and into the corresponding sediment receiving section or sump 21 with which the tank bottom is provided.

As previously indicated the sediment receiving section or sump 21 is provided for receiving sedimented material passed thereto as the result of the rotative movement of the raking assemblage corresponding thereto and the sedimented material in this section may be viewed as the concentrated sediment which is to be passed from the basin through the overflow conduit or pipe 26 that delivers the transferred sediment into the pier chamber. By making the upper portion of the conduit or pipe vertically positionable or adjustable, as for example, through the medium of a vertically positionable part or member 28 constituting the terminal member of the pipe 26, the overflow height can be varied and thereby there is realized means for controlling the character or relation of the solids concentration in the sediment overflow as the sedimentation apparatus or unit as a whole functions.

The chamber 24 has heretofore been described as one which is accessible from the top, and for the purpose of inspection, repair or the like it is provided with members 39 which in effect constitute the steps or rounds of a ladder extending for the full depth of the chamber.

It is quite common in systems employing pipes or conduits through which solids are hydraulically conducted, to employ some type of flushing system in order to remove obstructions which may result from undue localized settling of solid matter. To that end each of the conduits 25 leading to the main discharge conduit 34 is provided with a valve-controlled pipe 40 through which water under pressure can be supplied for flushing operations. Such a pipe is indicated in Fig. 1A.

The main discharge conduits are located in subterranean chambers or tunnels 41 that are accessible to an operator. These subterranean chambers 41 are located below the sedimentation unit, viz., a slight distance below the lowermost portion of the sedimentation basin or trough, they are at least substantially co-extensive throughout and thereby there is permitted access to the discharge conduit sections at the places where they join the main discharge conduit 34. The portions 32 heretofore referred to provide the connecting sections, and the valves 33 thereof as well as the valves in the pressure pipelines 40 are accessible to the operator when he is in the subterranean tunnel or conduit section 41.

The nested arrangements of sections as 15 and the functioning thereof in the system shown, constitute an invention of Harold B. Coulter entitled "Sedimentation apparatus", the patent application on which is being filed concurrently herewith.

The present invention revolves about the adjustable overflow construction according to which the hollow pier provides a chamber into which solids-liquid mixture from the receiving trough or section 21 is passed from the sedimentation basin. This arrangement provides a novel position for such type of control and one which is particularly useful in a desilting system of the type to which the Coulter invention is directed.

The invention of the present system, however, is not necessarily limited to a sedimentation basin or unit having in the single sedimentation zone thereof the several sets of nested units herein described, and it is manifest that the novel features of the present invention are applicable to any type of sedimentation unit regardless as to whether it has one or more solids-raking and conveying assemblages therein. It has been described in connection with the Coulter invention primarily because it has been developed for use in connection therewith.

The invention has been particularly described as useful in the desilting of river water. Manifestly, the underlying features of the invention are not necessarily limited thereto.

The present invention is applicable to or useful in apparatus known as clarifiers, as thickeners, and as hydro-separators.

It is applicable in many different fields of endeavor, for example:—in the handling and treating of either sewage or sewage sludge; in the purification of water; in the handling of trade wastes; in the separating of certain pulp or pulp-like mixtures; in the separating of certain solids, existing either as solids dissolved in liquid or as undissolved solids in suspension, which are primarily precipitatable only as the result of a flocculating operation or some similar treatment, whereby, incident to a settling or sedimentation operation, a liquid-solids mixture is realized and passed along one path from the lower interior section of a sedimentation apparatus while supernatant flows therefrom along another path; and in the hydro-separation of materials by processes according to which one type of solids content passes along one path from the sedimentation zone with the liquor found in the upper portion of that unit, while another type of liquid-solids mixture which is realized as the result of sedimentation passes off along another path from the lower interior portion of the apparatus.

From what has preceded it will be manifest that the invention hereof revolves about an apparatus—preferably about a continuous type of apparatus—according to which liquid to be subjected to sedimentation enters the unit at one locality, from which supernatant leaves the sedimentation unit along a path leading from the upper portion thereof, while another type of outflow—generally a liquid-solids mixture—leads from the lower interior portion thereof to and past an overflow construction, and according to which the overflow construction is vertically adjustable, thus having an adjustable or regulatory effect as to the character and amount of sedimentary deposit which can collect at the lower interior portion of the sedimentation zone or, in other words, thus regulating or adjusting the amount or percentage of solids concentration passing from the sedimentation zone with the liquid flowing therefrom through said overflow conduit construction.

The construction described and the operation thereof realizes certain advantages or advantageous features among which may be mentioned the following:

1. It provides a hollow pier which supports the raking mechanism and the driving mechanism therefor, and which is used in connection with the discharge of the underflow from the clarifier or thickener.

2. It provides means for controlling the rate of underflow discharge from the thickener (a) which in the construction shown is located within the thickener, and (b) which is the valve type.

3. It provides means for controlling the thickness of what is referred to as the sludge or pulp blanket which is maintained on the bottom of the thickener or clarifier and which is the result of the sedimentation or settling operation carried out therein, and which means is valveless and is located within or directly associated with a hollow pier that is centrally located with respect to sludge or solids raking and collecting mechanism which turns about said pier.

4. It provides a construction having means for hydrostatically controlling the thickness of the pulp blanket in a thickener or clarifier, also for controlling the rate of underflow discharge.

5. It provides a construction according to which there is a maintaining of a balancing column of pulp or thickener underflow material to an adjustable height for controlling the rate of underflow discharge.

6. It provides means according to which there is a maintaining of a balancing column of pulp or thickener underflow material within a hollow pier within the thickener or clarifier, balanced against the pulp blanket.

What is claimed is:

1. A sedimentation apparatus comprising, in combination; a construction providing a sedimentation basin having a bottom and marginal walls, into one section of which basin liquid-solids mixture to be subjected to sedimentation enters as influent and from a spaced section of which supernatant liquid resulting from a sedimentation operation carried out within the basin passes as effluent and from a lower interior section of which liquid containing a solids content in relatively concentrated amounts as the result of the settling of solids during the sedimentation operation is passed incident to the normal continuous operation of the apparatus; a pier that extends upwardly from the bottom of said sedimentation basin; a solids raking and collecting assemblage mounted on said pier so as to turn about a vertically extending axis; and means for turning said assemblage about said axis; said sedimentation basin having in the bottom thereof a receiving section into which settled solids are delivered as the result of the functioning of said solids raking and collecting assemblage; said apparatus being characterized in that the pier is hollow, is open at the top, extends above the operating level of the liquid within the sedimentation basin as said level is determined by the effluent discharge section of the basin and is closed at the bottom except for a discharge conduit leading therefrom and provides a receiving chamber for liquid-solids mixture discharged thereinto; and in that an overflow conduit construction is provided that leads from the said receiving section to and upwardly into the interior portion of the receiving chamber within the pier whereby an overflow section thereof according to the vertical position of the overflow section is relied upon to determine the character of the solids elimination from the influent supplied to the sedimentation basin as the apparatus functions.

2. A sedimentation apparatus as defined in and by claim 1, according to which the overflow conduit construction has a discharge valve leading from the lower portion thereof and delivering into the lower interior section of said hollow pier and provided so that incident to the opening of the valve there can be effected a draining of the sedimentation basin.

3. A unit comprising a settling basin into which a liquid-solids mixture is fed and having a supernatant liquid withdrawal means that determines the normal level of the liquid therein and of which the bottom provides a sediment receiving section for sedimented material transferred thereto; a stationary pier that extends upwardly from the bottom and that is hollow to provide a pier chamber therein; a motivated sediment raking assemblage turnable about said pier and which functions incident to the turning thereof to effect an impelling of sedimented material from diverse sections of the bottom of the basin to the aforesaid sediment receiving section; a conduit which leads from said sediment receiving section and that extends upwardly and terminates in an overflow portion that delivers as overflow sedimented material into the pier chamber; and a sediment discharge conduit that leads from the lower portion of the pier chamber to a locality outside of the basin.

4. A unit as defined in and by claim 3 and also comprising a valve controlled drain pipe leading from the lower portion of the basin and delivering into the lower portion of the pier chamber.

5. A unit as defined in and by claim 3, according to which the overflow portion of the conduit leading from the sedimentation receiving section and that delivers into the pier chamber is provided by a vertically positionable overflow weir construction, and also according to which said last mentioned conduit has a valve controlled drain branch leading from the lower portion of the conduit and delivering into the lower portion of the pier chamber.

WAYNE A. KIVELL.